United States Patent [19]

Dougherty et al.

[11] Patent Number: 5,036,112
[45] Date of Patent: Jul. 30, 1991

[54] CROSS-LINKABLE VINYL ETHER POLYACETAL OLIGOMERS

[75] Inventors: James A. Dougherty, Peguannock, N.J.; Jeffrey S. Plotkin, Monsey, N.Y.; Fulvio J. Vara, Chester; Kolazi S. Narayanan, Palisades Park, both of N.J.

[73] Assignee: GAF Chemicals Corporation, Wayne, N.J.

[21] Appl. No.: 470,488

[22] Filed: Jan. 26, 1990

[51] Int. Cl.$^5$ .............................. C08F 2/46; C08J 3/28
[52] U.S. Cl. ........................................ 522/31; 522/15; 522/181
[58] Field of Search ............................ 522/31, 181, 15

[56] References Cited

U.S. PATENT DOCUMENTS 4,416,826 11/1983 Neckers ................................. 522/46
4,885,319 12/1989 Dougherty et al. ................... 522/31

Primary Examiner—Marion E. McCamish
Assistant Examiner—Mark A. Chapman
Attorney, Agent, or Firm—Marilyn J. Maue; Joshua J. Ward

[57] ABSTRACT

This invention relates to a cross-linkable, cationic radiation curable composition comprising (a) a non-volatile vinyl ether, epoxide, acrylate or an oligomer thereof (b) a cationic photoinitiator and (c) a divinyl ether polyacetal oligomer having the formula

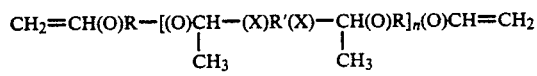

wherein
n has a value of from 1 to 50;
X is uniformly sulfur or oxygen;
R is $C_2$ to $C_4$ alkeneoxy alkylene, poly(alkyleneoxy) alkylene, or a branched, linear or cyclic $C_2$ to $C_{20}$ alkylene and
R' is phenylene, diphenylene methane, diphenylene propane, xylylene, tolylene, or a branched, linear or cyclic $C_2$ to $C_{20}$ alkylene optionally substituted with an ether, ester, carbonate, carbamate, $C_2$ to $C_4$ alkyleneoxy alkylene or poly($C_2$ to $C_4$ alkyleneoxy) alkylene radical. The invention also relates to the composition cured on a substrate.

19 Claims, No Drawings

CROSS-LINKABLE VINYL ETHER POLYACETAL OLIGOMERS

In one aspect, the invention relates to a radiation curable composition containing vinyl ether monomers or oligomers and, in another aspect, to the radiation curing of a vinyl ether or epoxide vinyl ether acetal composition.

BACKGROUND OF THE INVENTION

Certain acrylate radiation curable coatings and films are in great demand because of their rapid curing properties.

Since acrylates are not conducive to cationically induced radiation curing, they require free radical systems which are oxygen inhibited unless effected in an inert atmosphere, generally under a blanket of nitrogen. Although formulation with a photoinitiator which undergoes bimolecular reaction with a hydrogen donor minimizes the inhibitory effect of air, this benefit is realized at the expense of a greatly reduced curing rate. Also, it has been found that polymerization or curing in free radical systems ceases almost immediately upon removal from the source of radiation; thus, the cured product often contains significant amounts of unpolymerized components. The formulation of radiation curable coatings and films normally involve compositions containing acrylate monomers or acrylate functional oligomers together with free radical initiators and minor amounts of one or more adjuvants such as surfactants, slipping agents, defoamers, thickeners and thixothopes depending on the option of the formulator and consistent with the end use. Oligomers usually employed are acrylate functional end capped polymers such as urethane polyesters, polyols, acrylates, bisphenol A, epoxides and novalac epoxy resins.

Additional shortcomings of acrylate formulations includes their stability. Under normal storage conditions, these coating formulations require the incorporation of a free radical scavenger, e.g. a substituted hydroquinone or phenothiazine. However, after the coating has been applied, the inhibitory affect of the stabilizer contributes to a significantly reduced cure rate. Accordingly, it is an aim of research to develop oligomers which provide stable formulations and which have the beneficial properties of acrylates but which are amenable to radiation curing at a rapid rate by cationically induced polymerization which is not oxygen inhibited and which permits continued polymerization after removal from the source of radiation exposure.

It is also noted that the unsubstituted acrylates are sensitizers and skin irritants as well as being carcinogenic, so that specialized safety precautions must be taken to protect operators from exposure when these chemicals are handled in high concentration. Although alkoxylation has lessened skin irritancy of the acrylates, their carcinogenic properties are not reduced.

Some of the inherent deficiencies of the acrylate systems can be partially overcome by the use of epoxy resins. Epoxy resins can be polymerized by normal radiation techniques using cationic photoinitiators such as iodonium, sulfonium and ferrocene salts of hexafluorophosphate, hexafluoroantimonate and hexafluoroarsonate to produce a tack free film. In such formulations substantially complete polymerization of the mixture requires an extended period. It is well known that the polymerization of epoxy resins is extremely slow and requires as much as several days to achieve their ultimate physical properties. Thus, thermal curing is often employed to increase the rate of, or to complete the polymerization.

Accordingly it is an object of the present invention to overcome the above described deficiencies by employing an economical and commercially acceptable composition and curing process.

Another object of this invention is to utilize a multifunctional polymer, which is itself a polymerizable viscous liquid and which provides rapid radiation curing.

Another object is to provide a stable, non-toxic cross linkable copolymeric resin composition which is rapidly cured by cationic radiation to produce a film or coating on a substrate which possesses toughness, good adhesion, abrasion resistance and resistance to chemical attack in acid or basic media.

Still another object is to provide a more economical process for cross-linking monomeric or polymeric vinyl ethers which can be effected in the presence of air at ambient temperature and pressure.

Another object is to provide a vinyl ether, acrylate or epoxide composition which is curable at a rapid rate by radiation induced cationic polymerization.

These and other objects will become apparent from the following description and disclosure.

THE INVENTION

In accordance with this invention there is provided a radiation curable composition comprising:
(a) between about 1 and about 99 wt. % of a polymerizable or oligomeric, non-volatile vinyl ether, epoxide or acrylate;
(b) between about 0.1 and about 5 wt. % of a photoinitiator of which at least 25% is a cationic photoinitiator and
(c) between about 1 and about 95 wt. % of a divinyl acetal resin having the formula

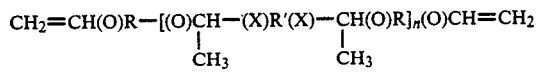

wherein
n has a value of from 1 to 50;
X is uniformly sulfur or oxygen;
R is $C_2$ to $C_4$ alkeneoxy alkylene, poly(alkyleneoxy) alkylene, or a branched, linear or cyclic $C_2$ to $C_{20}$ alkylene and
R' is phenylene, diphenylene, diphenylene propane, xylylene, tolylene, or a branched, linear or cyclic $C_2$ to $C_{20}$ alkylene optionally substituted with an ester, carbonate, carbamate, or a mono- or poly- $C_2$ to $C_4$ alkyleneoxy radical.

A feature of this invention is the discovery that inclusion of the present acetal component permits cationically induced radiation curing with a vinyl ether, epoxy ether, vinyloxy alkyl urethane, or epoxy acrylate to proceed to substantial completion at an enhanced rate and provides a liquid crosslinked product which is more adaptable to simple coating procedures.

The preferred compositions of this invention are those having from about 1 to about 50 wt. % of component (a); from about 0.5 to about 4 wt. % of component (b) and from about 45 to about 95 wt. % of component (c) wherein X is oxygen. Particularly preferred are those compositions wherein R' is the alcohol residue of bisphenol A, bisphenol F or cyclohexane dimethanol and R is $C_2$ to $C_4$ alkylene or the alcohol residue of cyclohexane dimethanol.

Suitable examples of component (a) include any of the mono- and di- vinyl ethers of di-, tri- or tetraethylene or propylene glycols; $C_2$ to $C_{20}$ alkylene divinyl ethers; benzene divinyl ether; and the corresponding thioethers, epoxides and acrylates which are nonvolatile liquids.

Examples of component (b) cationic initiators include the triphenyl sulfonium salt of phosphorous hexafluoride, diphenyl iodonium salt, a phenyl onium salt, an alkyl aryl onium salt, aryl ferrocene salts and the like.

The amount of cationic initiator employed in the present composition can range from about 25 to about 100%. The balance of any initiator mixture can include a free radical initiator to provide a bifunctional, hybrid initiated system. When the polyacetal oligomer of this invention is used as a diluent in a polymerizable composition containing from about 30 to about 99 wt. %, preferably from about 40 to about 60 wt. %, of a vinyl ether, epoxy ether, vinyloxy alkyl urethane or oligomer thereof, the composition can be cured at a rapid rate with an initiator component (b) containing between about 25 and 100% of a cationic initiator; although mixtures of a cationic initiator and from about 20 to about 75% of a free radical initiator are also beneficially employed and, in fact, are recommended when the polymerizable compound is an epoxy acrylate monomer or oligomer such as e.g. phenol A epoxyacrylate or an oligomer thereof. Examples of free radical initiators include hydroxycyclohexyl phenyl ketone, 2-hydroxy-2-methyl-1-phenyl propan-1-one, benzyl dimethyl ketal, 2-methyl-1-[4-(methylthio)phenyl]2-morpholino propanone. Other suitable free radical and cationic initiators are those described by M. J. M. Abadie, Advantages and Development of Photochemical Initiators, in the European Coatings Journal 5/1988, pages 350–358.

Component (c) includes the monomers and oligomeric resins disclosed in British patent 789,458 or sulfur bearing counterparts thereof which are prepared by the condensation reaction between a diol or thiol having the formula H(X)R'(X)H and a divinyl ether having the formula $CH_2=CH(O)R(O)CH=CH_2$ wherein X, R and R' are as defined above. Particularly preferred of the hydroxylated reactants are bisphenol A, bisphenol F, cyclohexane dimethylol and $C_2$ to $C_8$ diols optionally substituted with ether, alkyl, or halo groups. Preferred divinyl ethers are the divinyl ether derivatives of di-, tri- and tetra- ethylene glycols and propylene glycols, butyl divinyl ether, hexyl divinyl ether, cyclohexyl di(methylene vinyl ether).

The above compositions are readily prepared by mixing the components in any order until a uniform mixture is obtained. The resulting composition which is a viscous liquid is easily applied to a substrate in a thickness of from about 0.1 to about 20 mils, preferably from about 0.5 to about 10 mils. Suitable substrates include glass, ceramic, metal, plastic, wood, masonary and fabrics. Because of the improved liquid viscosity, it is possible to retain higher thicknesses of film build-up on the substrate surface. By regulating the amounts of component (a) with respect to component (c), the desired viscosity, e.g. between about 30 and about 1,000 cps, is achieved without the introduction of extraneous chemical solvents and the like. The presence of the divinyl acetal oligomer also permits rapid radiation curing, for example within a period of less than one second exposure to between about 50 to about 1500 millijoules/cm² of UV light; between about 0.5 and about 5 megarads dosage of radiation from an electron beam or equivalent dosage from laser emissions. It is to be understood that many other sources of radiation e.g. gamma rays, laser emissions, x-rays, can be used to effect curing. The radiation curing process is carried out at about room temperature under ambient pressure in the absence of solvent normally required with highly viscous materials such as the acrylates.

The present compositions also lend themselves to thermal curing procedures effected at a temperature between about 70° C. and about 150° C. for a period of from about 5 to about 25 minutes in the presence of thermal cationic initiators. Because of their sensitivity to curing by exposure to a source of radiation, the present products are also useful as photoresists when coated on a photographic film.

The compositions of this invention are readily spreadable viscous liquids which, when cured, provide clear films or coatings of superior toughness, abrasion resistance, and resistance to chemical attack in acid or basic media.

Having generally described the invention, reference is now had to the accompanying examples which illustrate preferred embodiments of the invention but which are not to be construed as limiting to the scope thereof as more broadly defined above and in the appended claims.

EXAMPLE 1

A divinyl ether acetal oligomer was prepared by reacting 1.2 moles of butanediol divinyl ether (BDDVE) with 1.0 mole of bisphenol A (Bis A) according to the method described in British patent No. 789,458. 50.0 grams of this oligomer (BDDVE/Bis A:1.2/1) is blended with 50.0 grams of triethylene glycol divinyl ether (DVE-3), 1.0 gram fluorochemical surfactant, and 4.0 grams of cationic photoinitiator (triphenyl sulfonium hexafluorophosphate in BLO) at 50° C. The resulting homogeneous liquid is applied to an aluminum panel using a Mayer bar applicator and exposed to 400 millijoules/cm² from a medium pressure mercury vapor lamp in air. Properties of the cured coating were determined immediately after UV exposure and after a post cure of 10 minutes at 177° C. (Table I)

TABLE I

| | PANEL COATING THICKNESS | |
|---|---|---|
| | 0.15 mil | 1 mil |
| PENCIL HARDNESS ASTM D 3363 | | |
| (a) after UV exposure | 3H | <4B |
| (b) after post cure | 3H | 2H |
| % ADHESION ASTM D 3359 | | |
| (a) after UV exposure | 60 | 0 |
| (b) after moderate heat accelerated annealing | 100 | 92 |
| MANDRELL BEND | | |
| (a) after UV exposure | ⅛ | ⅛ |
| (b) after post cure | ⅛ | ⅛ |
| MEK RESISTANCE (No. of 2 way rubs) | | |
| (a) after UV exposure | 1 | 15 |
| (b) after post cure | 2 | 13 |

EXAMPLE 2

Example 1 was repeated except the BDDVE/Bisphenol A:1.2/1 acetal oligomer was replaced by an oligomer prepared by reacting 2.0 mole of cyclohexane dimethanol divinyl ether (CHVE) with 1.0 mole of bisphenol A (CHVE/Bisphenol A:2/1). Results are shown in Table II.

TABLE II

| | PANEL COATING THICKNESS | |
|---|---|---|
| | 0.20 mil | 1.50 mils |
| PENCIL HARDNESS ASTM D 3363 | | |
| (a) after UV exposure | 2H | H |
| (b) after post cure | 2H | 4H |
| % ADHESION ASTM D 3359 | | |
| (a) after UV exposure | 100 | 0 |
| (b) after moderate heat (50° C.) accelerated annealing | 100 | 0 |
| MANDRELL BEND | | |
| (a) after UV exposure | ⅛ | 3/16 |
| (b) after post cure | ⅛ | ⅛ |
| MEK RESISTANCE (No. of double rubs) | | |
| (a) after UV exposure | 1 | >100 |
| (b) after post cure | 1 | >100 |

EXAMPLE 3

The vinyl ether functional acetal oligomer prepared in Example 2 is mixed with an equal weight of the diglycidyl ether of butanediol (RD-2, Ciba-Geigy), one part per hundred resin (PHR) of a fluorochemical surfactant, and 4 PHR of a cationic photoinitiator (triphenyl sulfoniumn hexafluorophosphate in BLO) were mixed at 50° C. The resulting homogeneous liquid is applied to an aluminum panel using a Mayer bar to give a coating thickness of approximately 2 mil. The liquid coating is exposed to 1100 millijoules/cm² from a medium pressure mercury vapor lamp in air. Properties were determined immediately after UV exposure and after a post cure of 2 hours at 50° C. (Table III).

TABLE III

| | PANEL COATING THICKNESS |
|---|---|
| | 2 mils |
| PENCIL HARDNESS ASTM D 3363 | |
| (a) after UV exposure | F |
| (b) after post cure | H |
| % ADHESION ASTM D 3359 | |
| (a) after UV exposure | 0 |
| (b) after moderate heat (50° C.) accelerated annealing | 100 |
| MANDRELL BEND | |
| (a) after UV exposure | ⅛ |
| (b) after post cure | ⅛ |
| MEK RESISTANCE (No. of double rubs) | |
| (a) after UV exposure | 99 |
| (b) after post cure | 29 |

EXAMPLE 4

The vinyl ether functional acetal oligomer prepared in Example 2 is mixed with an equal weight of hexanediol diacrylate (HDDA), 1 PHR fluorochemical surfactant, 2 PHR cationic photoinitiator [triphenyl sulfonium hexafluorophosphate in butyrolactone (BLO) solvent], and 2 PHR free radical photoinitiator (1-hydroxycyclohexylphenyl ketone) at 50° C. The resulting homogeneous liquid is applied to a polyester film using a Mayer bar to give a coating thickness of approximately 2 mil. The liquid coating is exposed to 400 millijoules/cm² from a medium pressure mercury vapor lamp in nitrogen. Properties were determined immediately after UV exposure and after a post cure of 2 hours at 50° C. Results are as reported in following Table IV.

TABLE IV

| | PANEL COATING THICKNESS |
|---|---|
| | 2 mils |
| PENCIL HARDNESS ASTM D 3363 | |
| (a) after UV exposure | H |
| (b) after post cure | 2H |
| % ADHESION ASTM D 3359 | |
| (a) after UV exposure | 32 |
| (b) after moderate heat (50° C.) accelerated annealing | 100 |
| MEK RESISTANCE (No. of rubs) | |
| (a) after UV exposure | >100 |
| (b) after post cure | >100 |

EXAMPLE 5

Example 4 is repeated except that triethylene glycol diacrylate (TEGDA) replaced HDDA. Results are as reported in following Table V.

TABLE V

| | PANEL COATING THICKNESS |
|---|---|
| | 2 mils |
| PENCIL HARDNESS ASTM D 3363 | |
| (a) after UV exposure | H |
| (b) after post cure | 2H |
| % ADHESION ASTM D 3359 | |
| (a) after UV exposure | 100 |
| (b) after moderate heat (50° C.) accelerated annealing | 100 |
| MEK RESISTANCE (No. of rubs) | |
| (a) after UV exposure | >100 |
| (b) after post cure | >100 |

In the above tests, the unchanged values after UV exposure and after post cure for pencil hardness and mandrell bend indicate that these coating formulations do not require post curing to achieve their full crosslinked potential after the radiation induced concurrent cationic and free radical curing.

It will be understood that any of the other non-volatile liquid vinyl ethers of component (a) and any of the divinyl acetal resins indicated above can be substituted in the foregoing examples to provide the beneficial coatings described therein.

What is claimed is:

1. A radiation curable composition comprising:
   (a) a non-volatile, polymerizable compound of the group of vinyl ether, epoxide, acrylate, vinyloxy alkyl urethane and an oligomer of said compound;
   (b) an effective initiating amount of a photoinitiator containing at least 25% of a cationic photoinitiator and
   (c) a divinyl ether polyacetal oligomer having the formula

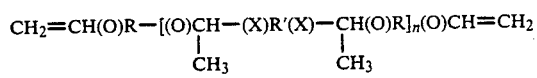

wherein n has a value of from 1 to 50;

X is uniformly sulfur or oxygen;

R is $C_2$ to $C_4$ alkeneoxy alkylene, poly(alkyleneoxy) alkylene, or a branched, linear or cyclic $C_2$ to $C_{20}$ alkylene and R' is phenylene, diphenylene, diphenylene propane, xylylene, tolylene, or a branched, linear or cyclic $C_2$ to $C_{20}$ alkylene optionally substituted with an ester, carbonate, carbamate, or a mono- or poly- $C_2$ to $C_4$ alkyleneoxy radical.

2. The composition of claim 1 wherein components (a), (b) and (c) are present in the amounts of between about 1 and about 98 wt %; between about 0.1 and about 5 wt and between about 1 and about 95 wt % respectively.

3. The composition of claim 2 wherein components (a), (b) and (c) are present in amounts of between about 1 and about 50 wt %; between about 0.5 and about 4 wt % and about 45 and about 95 wt % respectively.

4. The composition of claim 1 wherein X of component (c) is oxygen.

5. The composition of claim 1 wherein R' of component (c) is the alcohol residue of bisphenol A, bisphenol For cyclohexane dimethanol and R of component (c) is a $C_2$ to $C_4$ methyl methyleneoxy vinyl ether.

6. The composition of claim 1 wherein said photoinitiator is triphenyl sulfoniun hexafluorophosphate.

7. The composition of claim 1 wherein said photoinitiator is 1-hydroxycyclohexyl phenyl ketone.

8. The composition of claim 1 wherein component (a) is hexanediol diacrylate.

9. The composition of claim 1 wherein said photoinitiator is a mixture of triphenyl sulfonium hexafluorophosphate and 1-hydroxycyclohexylphenyl ketone.

10. The composition of claim 1 wherein said component (b) is a mixture of a cationic and a free radical initiator.

11. The composition of claim 1 wherein the photoinitiator is 100% cationic photoinitiator.

12. The composition of claim 11 wherein between about 40 and about 60 wt. % of the composition is a polymerizable vinyl ether, epoxide or vinyloxy alkyl urethane.

13. The composition of claim 10 wherein component (a) is triethylene glycol diacrylate.

14. The composition of claim 1 wherein component (a) is the diglycidyl ether of butanediol.

15. The composition of claim 1 wherein component (a) is triethylene glycol divinyl ether.

16. The composition of claim 1 wherein component (c) is

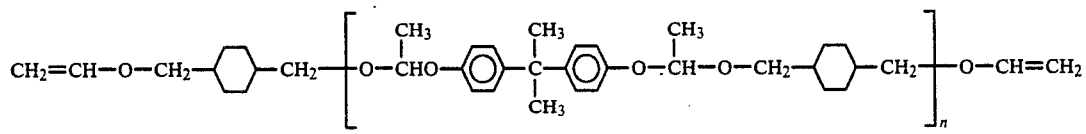

where n is 2-6.

17. The composition of claim 1 wherein component (c) is

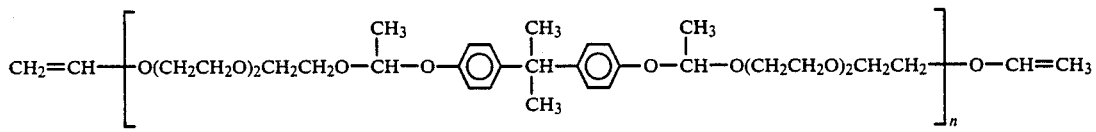

where n is 2-6.

18. The composition of claim 1 wherein component (c) is

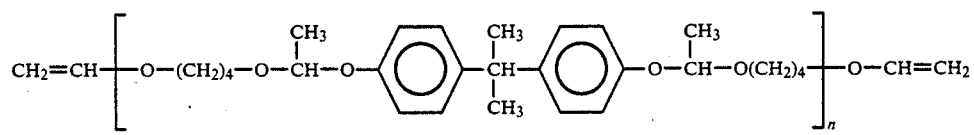

where n is 2-6.

19. A product of manufacture coated with an effective surface protecting amount of the cured composition of claim 1.

* * * * *